Figure 1:
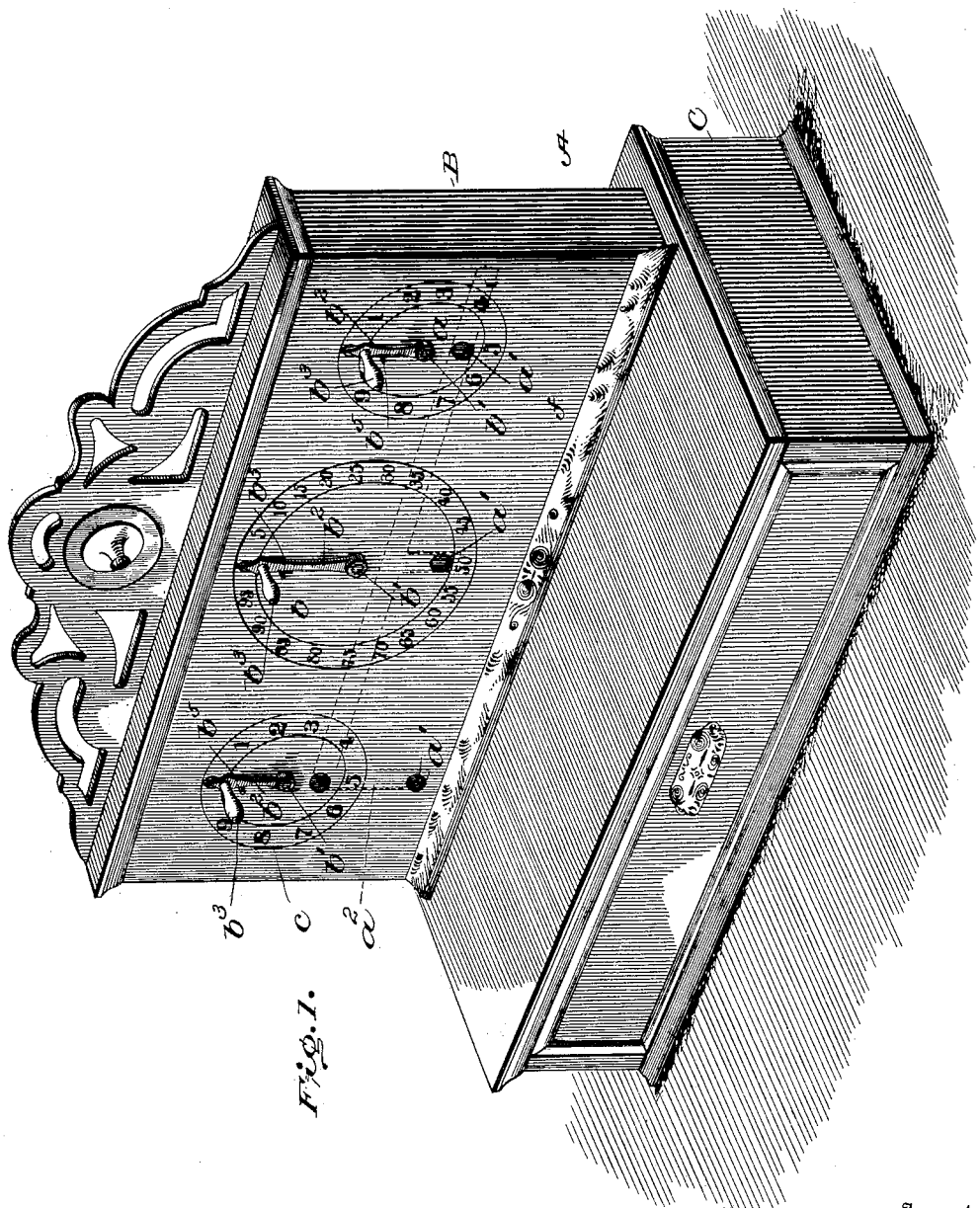

(No Model.)  A. S. WELLS.  5 Sheets—Sheet 1.
CASH REGISTER.

No. 596,927.  Patented Jan. 4, 1898.

Witnesses
Jno. Imine
Chas. E. Riordon

Inventor
Alfred S. Wells
By Julian C. Dowell
His Attorney

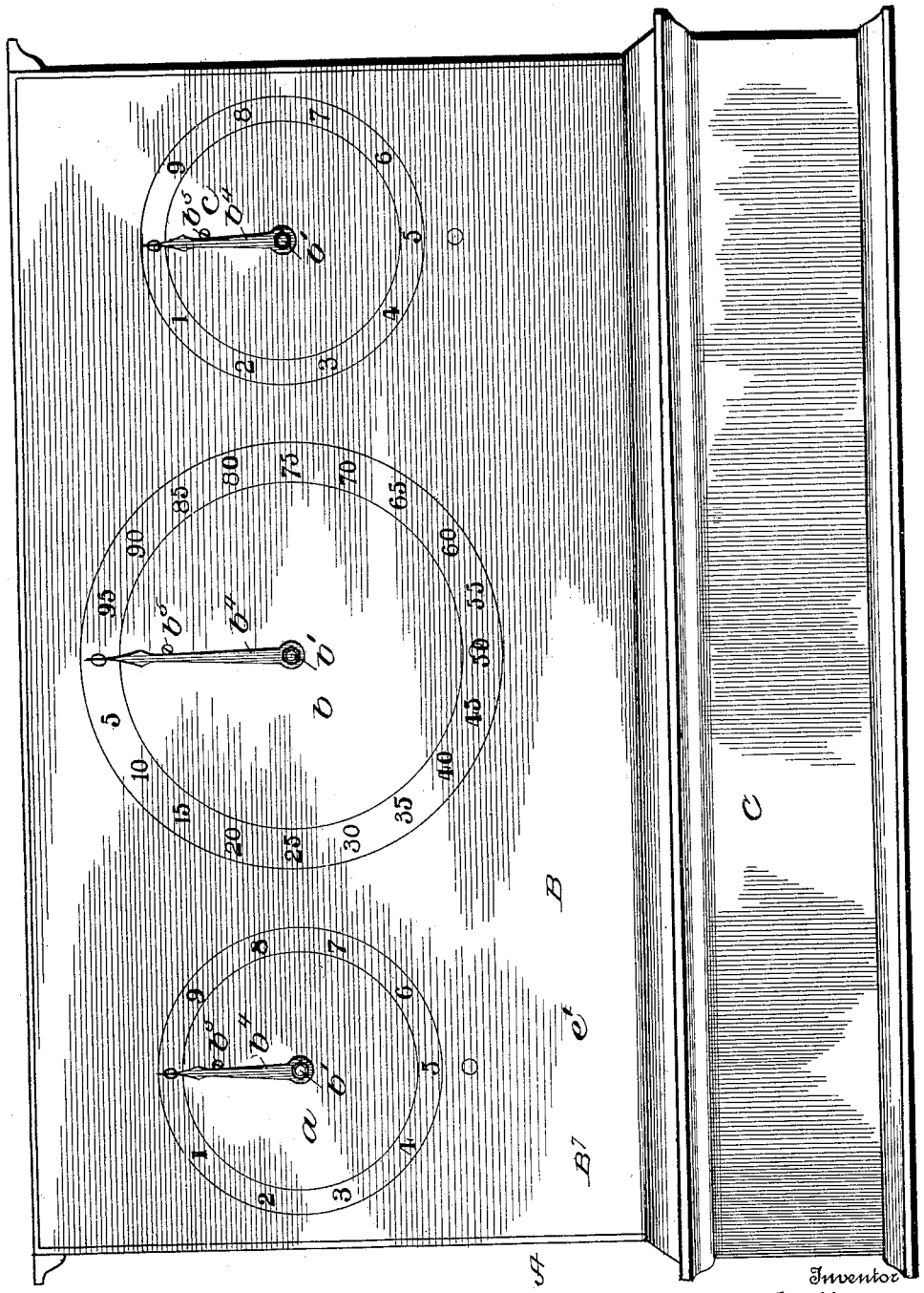

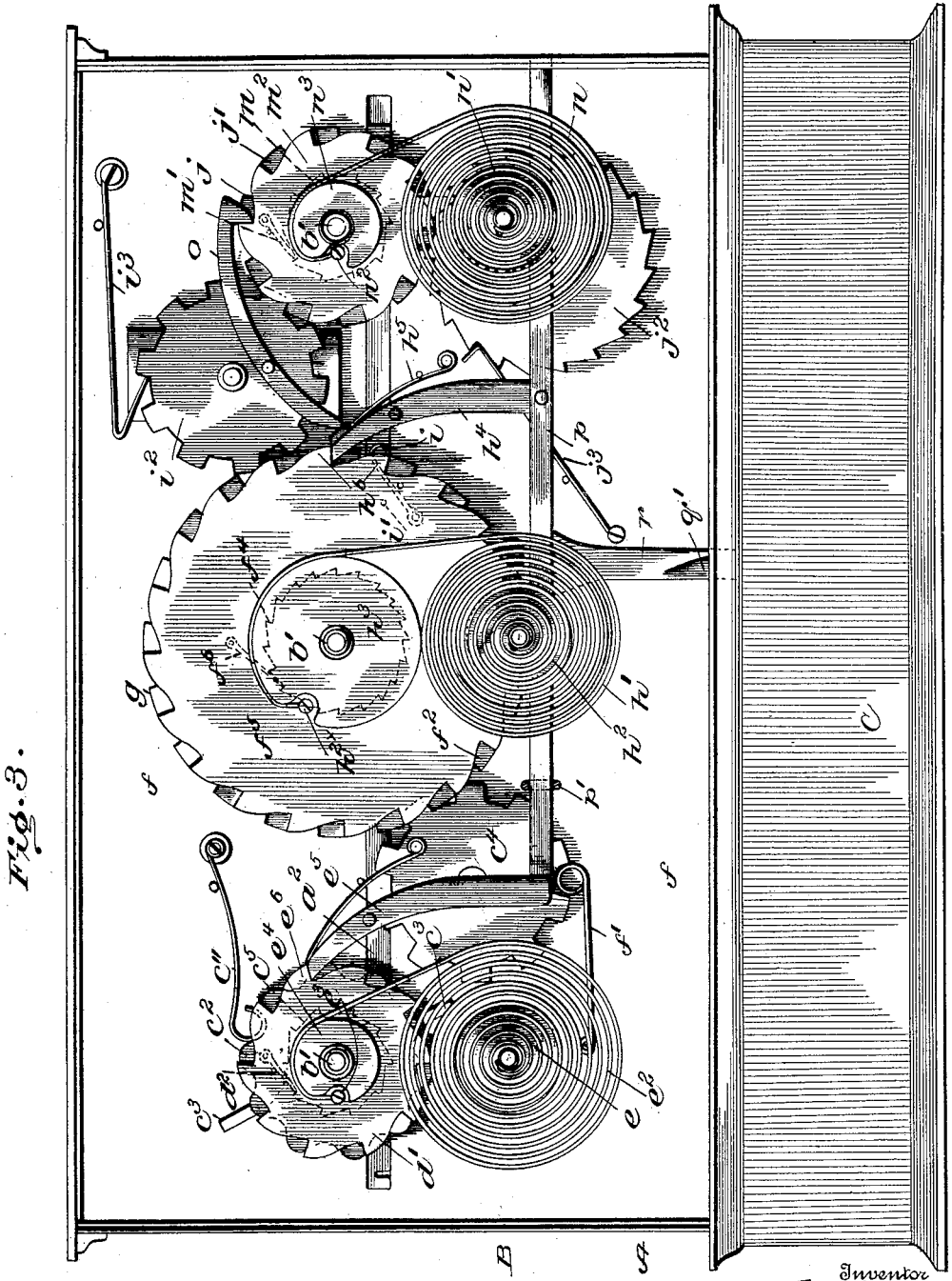

(No Model.)  5 Sheets—Sheet 4.
A. S. WELLS.
CASH REGISTER.
No. 596,927.  Patented Jan. 4, 1898.
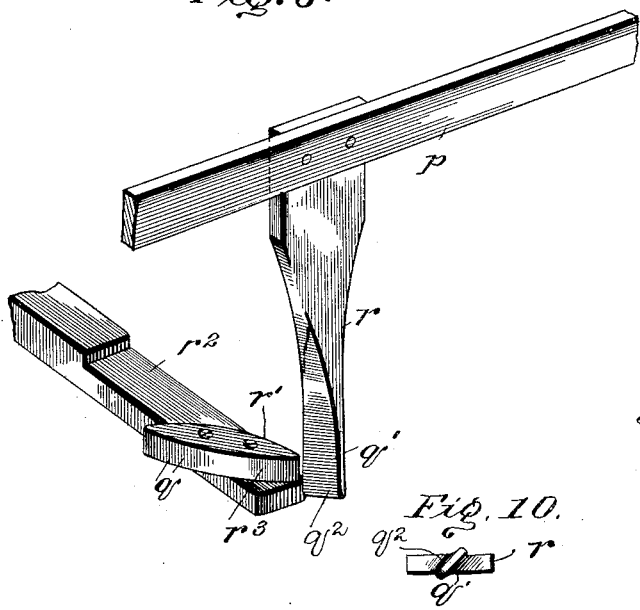
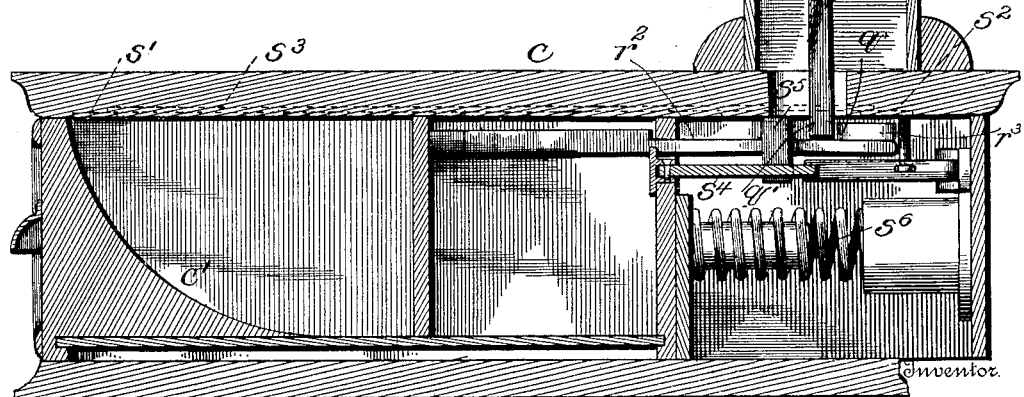
Witnesses
Jno. Finnie
Chas. E. Riordon
Inventor
Alfred S. Wells
By Julian C. Dowell
His Attorney

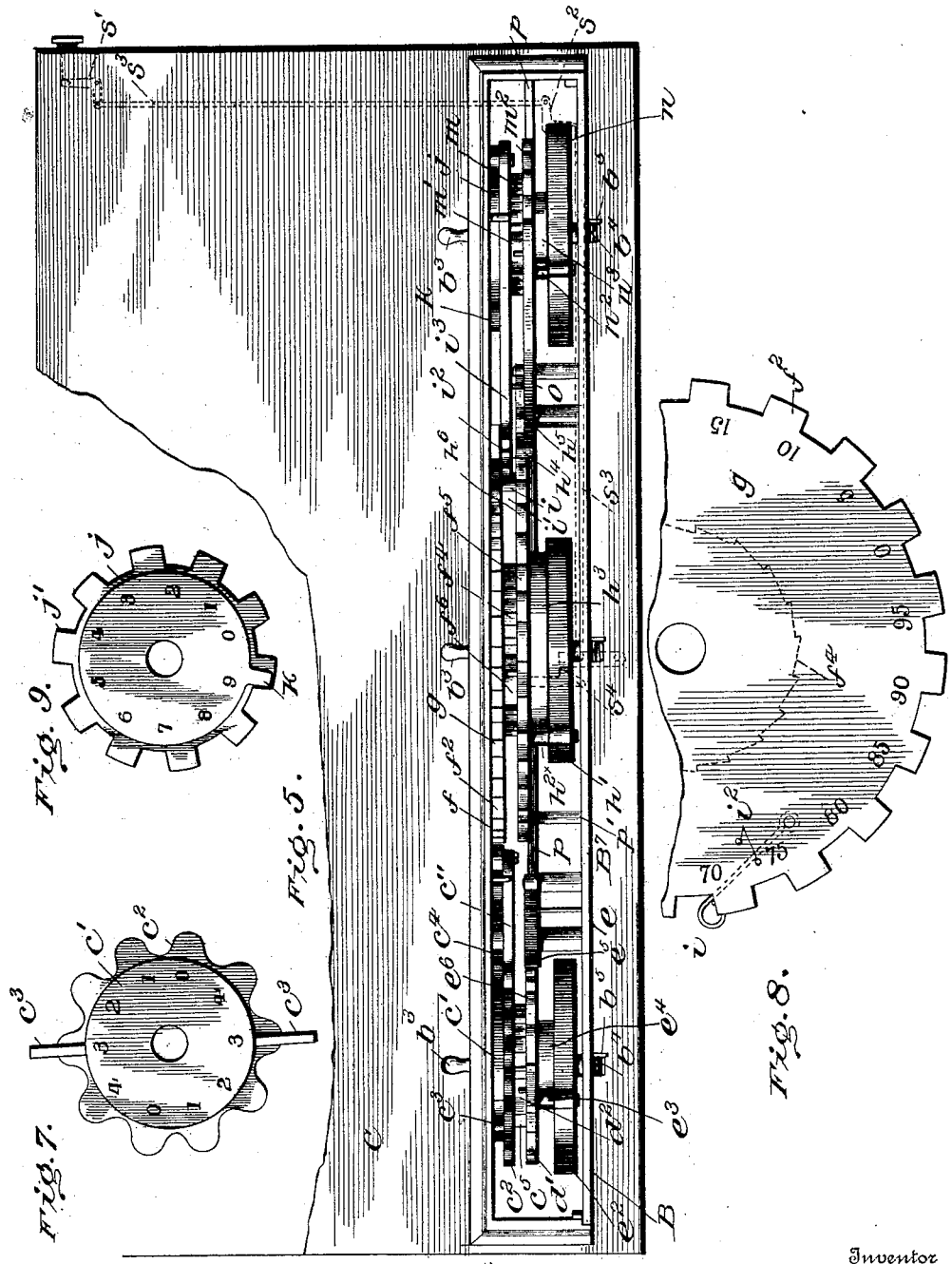

UNITED STATES PATENT OFFICE.

ALFRED S. WELLS, OF JACKSON, MICHIGAN, ASSIGNOR TO THE NOVELTY MANUFACTURING COMPANY, OF SAME PLACE.

CASH-REGISTER.

SPECIFICATION forming part of Letters Patent No. 596,927, dated January 4, 1898.

Application filed May 27, 1897. Serial No. 638,462. (No model.)

*To all whom it may concern:*

Be it known that I, ALFRED S. WELLS, a citizen of the United States, residing at Jackson, in the county of Jackson and State of Michigan, have invented certain new and useful Improvements in Cash-Registers; and I do hereby declare the following to be a full, clear, and exact description of the invention, such as will enable others skilled in the art to which it appertains to make and use the same.

My invention relates to cash-registers, and more particularly to that class which employ means to indicate the amount of the purchase and in connection therewith adding or registering mechanism for adding the several amounts together as each successive purchase is indicated, and mechanism for returning the purchase-indicating means to normal position—that is, to zero—after each purchase without affecting the adding or registering mechanism.

The objects of my invention are, first, to provide simple and efficient means for indicating the amount of each purchase, and in connection with these means an adding or registering mechanism operated at the same time as the purchase-indicating means, so as to add the amount of each purchase to the sum-total of preceding purchases and register the amount computed each time a purchase is indicated; second, to provide efficient means for automatically resetting the purchase-indicating means to normal position, or zero, through the closing of the cash-drawer, without affecting the adding or computing mechanism, so that when the next purchase is indicated it will be added to the previous one, and so on, thereby registering the aggregate amount of purchases, and, third, to so arrange the adding or registering mechanisms that the registering wheel or dial of a lower denomination, as the unit or penny wheel, shall, after registering an amount equal to its full capacity, which is done either by the complete rotation of the indicator-arms at a single movement or by the successive oscillations thereof, transfer said amount to an adjacent registering wheel or dial of a higher denomination, as the nickel or dime registering mechanism, and cause the latter to register the amount transferred, while any lesser sum than that transferred will be registered by the transferring wheel or dial until an amount equal to its full capacity is reached, when another transfer will take place, and so on through the series of registering mechanisms from each lower to the next higher denomination in the series—that is to say, the penny-wheel is adapted to register from one to four cents and to transfer each five cents onto the nickel-wheel, and if a purchase is more than five but less than ten cents the excess of its capacity will be registered thereby until the excess amounts to five cents, when it will be transferred. The nickel-wheel will in like manner register to within a nickel of its capacity (one dollar) and will transfer each dollar onto the dollar-wheel, while any excess or fraction of a dollar, as when a purchase is more than one but less than two dollars, will be registered thereby, and the dollar-wheel will transfer the amount equal to its capacity onto a ten-dollar or other wheel, as desired, and so on as far as desired.

The invention will first be hereinafter more particularly described with reference to the accompanying drawings, which form a part of this specification, and then pointed out in the claims at the end of the description.

Referring to the accompanying drawings, in which similar letters of reference denote similar parts, Figure 1 is a perspective view of a cash-register constructed in accordance with my invention. Fig. 2 is a rear elevation of the casing. Fig. 3 is a rear elevation with the rear casing-plate removed to show the arrangement of the adding or registering mechanism and the releasing means which allows the mechanism for returning the indicating-arms to normal or zero position to operate. Fig. 4 is a vertical sectional view of the casing, the mechanism contained therein, and the cash-drawer, on an enlarged scale. Fig. 5 is a top plan view. Fig. 6 shows a detail perspective view of the wedge or cam carried by the cash-drawer and the depending arm of the releasing mechanism for controlling the indicator-arms and pointers, and also a bottom plan view of said depending arm. Fig. 7 is a detail view of the face of the penny adding or registering dial, showing the arrangement of the numerals thereon. Fig. 8 is a detail view of the face of a part of the nickel adding or registering wheel, and Fig. 9 is a detail view of the face of the dollar adding or registering wheel.

In the practical application of my invention I may use a casing A, in which the several parts of the mechanism employed are arranged and located. The casing is preferably formed with the vertical portion B, in which the indicating and computing or adding mechanisms are located, and the transverse portion C for containing the cash-drawer. The vertical portion B of the casing may be provided on its front and back with the penny, nickel, and dollar dials $a$, $b$, and $c$, respectively, the advantage of which is that both the purchaser and operator can perceive the amount being registered. The dial $a$ for pennies is divided into ten spaces and numbered "0" to "9," the nickel-dial $b$ into twenty spaces and numbered "0" to "95," and the dollar-dial $c$ into ten spaces and numbered "0" to "9." The portion B of the casing is further provided with the apertures or sight-openings $a'$, arranged as shown, through which the figures on the several dials can be seen, which indicate the aggregate amount of the sales. These openings are normally closed by a slide $a^2$, so as to conceal the total amount registered from the operator and purchaser.

Suitably journaled in the front and rear plates of the portion B of the casing are the shafts $b'$, carrying at one end the indicator-arms $b^2$, provided with the operating-handles $b^3$ and on their other ends with the pointers $b^4$ in order that the purchaser can perceive the amount registered. $b^5$ denotes a stop provided for each one of the indicators $b^2$ to limit their movement in returning to zero position. If desired, ball-bearings may be employed for journaling the shafts or spindles, in any places where such method of journaling is found practicable or advantageous.

The arrangement of the registering or adding dials on the several shafts or spindles will now be described, beginning with the penny-registering means. On the shaft $b'$, provided for this means, I loosely mount a registering wheel or dial $c$, provided on its face adjacent the front of the casing with numerals arranged as follows: "1, 2, 3, 4, 0, 1, 2, 3, 4, 0," which can be seen through the sight-opening provided within the fixed dial, and on its periphery with a number of teeth $c^2$ equal to the numerals arranged on the fixed dial—in this case ten. The dial is held from a too free movement by means of the spring-pawl $c''$, one end of which is fixed to the casing and having its free end in engagement with the teeth of the dial. On one of the hubs of this dial I provide the diametrically-arranged projections or arms $c^3$, which are preferably in the same radial line as the two "3" numerals, and these projections or arms, when the dial has registered five pennies, will successively engage with an intermediate toothed wheel or pinion $c^4$, which is in engagement with the nickel-wheel, to move the nickel-wheel one space, and thus register a nickel thereon. The other hub is provided with the ratchet-teeth $c^5$, which also correspond in number with the numerals on the dial, and just in the rear of the hub I provide a disk or wheel $d'$, which is fast upon the shaft or spindle $b'$, so that it will turn with it. This dial carries on one of its faces a pawl $d^2$, which engages with the ratchet-teeth $c^5$ on the hub of the registering-dial when the fixed dial is turned in the registering direction by means of the indicator-arms; but when the fixed dial is returned to its normal or zero position the pawl $d^2$ will ride over the teeth and not affect the position of the registering or adding dial. The means for returning the fixed dial and indicator-arm to normal or zero position comprises the following parts: A drum $e$ is secured to the rear plate $e'$ of the portion B of the casing, and coiled about this drum is a flat spring $e^2$, one end of which is secured thereto, while the other end of the spring is secured to a projection $e^3$, carried on the fixed dial. When the fixed dial is turned, the spring winds upon a cam-drum $e^4$, carried on one face of the fixed disk, so as to cause a movement of the disk in an opposite direction when it is released. In order to hold the fixed disk in the position to which it is turned against the action of the spring when it is desired to register on the penny-dial, I provide a pawl $e^5$, carried by the plate $e'$ of the portion B, which is held in engagement with the ratchet-teeth $e^6$ on the periphery of the fixed disk, and said pawl is disengaged from the teeth $e^6$ by mechanism hereinafter described and operated by the closing of the cash-drawer. When the pawl is disengaged from the fixed disk, the spring will then act on it and cause it to return to its normal position and set the indicator-arms at zero without in any manner affecting the position of the penny-registering dial.

When the penny-dial has been turned to register five cents, one of the diametrically-arranged arms $c^3$ comes into engagement with the toothed wheel $c^4$, journaled to the front casing-plate $f$ to move it one space. This wheel is held from a too free movement by means of a pawl $f'$. This toothed wheel being in engagement with the teeth $f^2$ on the periphery of the nickel dial or wheel $g$, which is loosely mounted on the next shaft $b'$, will move it one space and thus register a nickel thereon. The nickel-dial is provided on its face adjacent the casing with a series of numerals "0" to "95," which correspond to the numerals on the dial at the front of the casing, and they are so arranged thereon that as the dial is turned the numerals can be seen through the sight-aperture provided at the front of the casing. The nickel-wheel is also provided on its periphery with twenty teeth equaling the nickel-divisions in a dollar and with an integral hub provided with ratchet-teeth $f^4$ also equal in number to the peripheral teeth of the registering-disk. Just in the rear of the dial is a disk or dial $f^5$, fixed on the shaft or spindle and carrying a pawl $f^6$, in engagement with the ratchet-teeth on the hub, so that when the indicator-arm and fixed disk are turned in the registering direction it will carry the registering-dial with it, but will not affect the position of the registering-dial when it is returned to normal position. The fixed disk is returned to normal or zero position in the same manner as is the previously-described disk, a flat spring $h'$ being employed, which is fixed at one end to a drum $h^2$, carried on the rear casing-plate, and coiled about it, while its other end is secured to a projection $h^{2\times}$ on the fixed disk. When the disk is turned, the spring will be wound around the cam-hub $h^3$, carried by the fixed disk, so as to cause the disk to turn in an opposite direction when released. This disk is also held in the position to which it is turned by a pawl $h^4$, acted upon by a spring $h^5$, and only released from engagement with the peripheral teeth $h^6$ by the closing of the drawer and the intermediate mechanism.

The nickel-disk has pivoted to it on one of its faces one end of a gravity-pawl $i$, which is held in its movement between the fixed projections $i'$, carried by the disk. This pawl is so arranged on the registering-disk that it will engage with a toothed wheel $i^2$ to move the dollar-wheel one space after a dollar in nickels has been registered by the nickel-wheel. It will then move out of the way of the said toothed wheel, and as the nickel-wheel is turned for further registering it will come into position for further engagement with the toothed wheel $i^2$ to move it another space. The toothed wheel $i^2$ is also provided with a spring $i^3$, carried by the casing and having one end in engagement with it to prevent a too free movement thereof. The toothed wheel $i^2$, as above stated, when engaged by the pawl, moves the dollar-wheel one space. The arrangement and form of the dollar-registering dial are substantially the same as the form and arrangement of the penny-wheel. The registering-dial $j$ is loose on the shaft and is provided on its face next the casing with numerals arranged from "0" to "9," to correspond with the numerals on the fixed dial of the casing, and so arranged that they can be seen through the sight-opening in the face of the fixed dial, as is the case with the nickel and penny dials. The periphery of the dial is provided with ten teeth $j'$, which are engaged by the toothed wheel intermediate the nickel and dollar wheels, and the hub of the dollar-wheel is provided with an arm or projection $k$, extending in a radial line therefrom, which after the dollar-dial is moved one revolution engages with a tooth of the ten-dollar wheel $j^2$ to move it one space. The ten-dollar wheel is provided with numerals on its face, which can be seen through the sight-opening provided for this purpose. The ten-dollar wheel is held from a too free movement by a pawl $j^3$, in engagement therewith. The other hub of the dollar-dial is provided with ratchet-teeth $m$ of a number equal to the peripheral teeth of the dial, and in engagement with the ratchet-teeth is a pawl $m'$, carried by the disk $m^2$, fixed on the shaft or spindle which is located just in the rear of the registering-dial. The fixed disk is returned to normal position by means of the flat spring $n$, which is coiled about the drum $n'$, carried by the casing and to which one end of the spring is secured, while the other end of the spring is secured to a projection $n^2$ on the fixed disk. When the shaft is turned to move the dial, the fixed disk is turned with it and the spring is wound upon the cam-face $n^3$, carried by the fixed disk. The disk is held in the position to which it is turned by the pawl $o$, pivoted to the casing, and when the pawl is disengaged therefrom the spring returns the fixed disk and the indicator-arm to zero position, without, however, affecting the position of the registering-dial.

As above stated, the pawls holding the indicators in their registering positions are released by the closing of the cash-drawer $C'$ through intermediate mechanism. This mechanism consists of the longitudinally-moving rod $p$, with which the pawls are connected, suitably supported in guides $p'$ and having one end flush with the side of the casing, so that the rod cannot be moved when the drawer is not operated. The rod has a loose connection with the pawl controlling the returning mechanism of the nickel-wheel, and when this pawl is moved by the rod it engages the pawl of the dollar-disk to release the controlling mechanism, while the end of the rod engages the pawl of the controlling means for the penny-dial. The rod is moved by means of a cam or wedge $q$, carried on the cash-drawer, coming into engagement with the cam-face $q'$ of a depending arm $r$ of the rod. The faces are so arranged that when the drawer is closed the face $r^3$ of the cam causes the arm to move the rod transversely and operate the pawls to disengage them from the spring controlling means and allow the indicator arms and disks to return to normal position, and the continued movement of the cam allows the arm to pass through the space $r^2$ provided for it and allows the rod and pawl to return to normal position. It will be understood that the releasing mechanism is not affected by the opening of the drawer, which is done by any desired means, owing to the face $r'$ of the cam being sufficiently inclined to allow the arm to pass the cam, the arm being formed with an oblique side $q^2$ for the same purpose. In the present instance I employ the following means to open the cash-drawer: a push-button operating upon bell-crank levers $s'$ and $s^2$ and connecting-rods $s^3$ to disengage the pivoted hook $s^4$ from the stop $s^5$, carried by the casing, and allow the spring $s^6$ to force the drawer out.

The operation of my device is as follows, assuming that all of the dials are at zero, their normal position: If a purchase is to be registered, the indicator-arms are turned to the points on the fixed dials to indicate the purchase and at the same time cause the amount to appear at the sight-openings on the registering or adding dials which are moved. This is only true at the first purchase, for each subsequent purchase is added to the previous one and only the aggregate amount is given at the sight-openings. To illustrate, suppose a purchase of eighty-three cents is to be registered. The penny and nickel indicator-arms are turned over their respective dials to this amount, the nickel indicator-arm being at 80 and the penny indicator-arm at 3. The same amount will appear at the sight-openings of the two dials. The dials, as above stated, will show eighty-three cents, and the cash-drawer may then be opened in the manner hereinbefore set forth. As the cash-drawer is closed the cam or wedge will operate the rod to release the pawls engaging the controlling mechanism simultaneously, so that the springs will return the dials to zero position, but leave unaffected the position of the registering-dials, which, as stated, indicate eighty-three cents, so as to have the device ready for a second registering, which, for example, will be six cents. This amount can be registered either as five cents on the nickel-dial and one cent on the penny-dial or as six cents on the cent-dial alone. In the registering the indicator-arm of the fixed nickel-dial is moved to "5" thereon, which causes the registering-dial to be moved one space to show "85" at the sight-opening, and the indicator-arm on the fixed penny-dial to "1" thereon, causing the penny-registering dial to show "4" through the sight-aperture, so that the total will read "89" through the sight-openings, or the six cents may be registered on the penny-dial alone. Should this be the case, the indicator-arm on the fixed penny-dial will be turned to "6." In this instance it will be remembered that the face of the registering-dial is numbered "1, 2, 3, 4, 0, 1, 2, 3, 4, 0," and at each "3" numeral thereon an arm projects so as to engage with the intermediate toothed wheel to move the nickel-wheel one space. In the previous purchase of eighty-three cents the penny-dial registers three cents, and the turning of the dial two notches by the indicator-arm (making five cents) will move the arm on the dial to engage the intermediate wheel to move the nickel-wheel one space and show "85" at the sight-opening, and on completing the turning of the arm to register the six cents (four more spaces having to be passed over) "4" will appear at the penny sight-opening. The drawer, having been opened, is then closed to operate the releasing mechanism and thus return the indicator to normal or zero position. The device will indicate eighty-nine cents and be ready for the next registering, which, for a further example, will be thirty-eight cents. To do this, the nickel indicator-arm will be turned to "35" on the dial. As this is done and after fifteen cents has been registered on the fixed dials the indicator-arms will have moved the nickel-wheel so that the gravity-pawl will engage the intermediate toothed wheel above referred to to move the dollar-wheel and thus register a dollar without moving the indicator-arm on that dial, which amount will be seen through the sight-aperture. The excess of the amount to register the dollar (twenty cents) will appear at the nickel sight-aperture, though the fixed nickel-dial will register "35." The three cents is thus registered, or, as above stated, it can be registered at the same time as the nickels. As only one cent is needed to make a nickel, four being registered, the nickel-wheel will be moved a notch, so that "25" will be registered at the nickel sight-opening and the excess (two cents) at the penny sight-opening. Should the purchase be more than a dollar, the dollar-dial is turned to indicate the amount of dollars and the other dials for the balance of the purchase.

From the foregoing description it will be seen that I have devised a cash-register that will indicate the amount of the purchase and compute and register the aggregate amount of purchases, and I so arrange the mechanism that the dials can be operated either simultaneously or separately to indicate the purchase and at the same time register it, and each dial each time an amount equal to its full capacity is reached will add that amount to the next dial (of higher denomination) and at the same time register any excess below the lowest amount that can be registered on said dial of higher denomination.

Having thus fully described my invention, what I claim as new, and desire to secure by Letters Patent of the United States, is—

1. In a cash-register, the combination of a casing having an indicator-dial on one wall and a sight-opening through the same wall, a shaft journaled in the casing and projecting through the said wall and having affixed to it an indicator-arm extending over said dial, a registering-wheel loose on the said shaft within the casing and adjacent to the said wall of the same where its inscriptions may show through the sight-opening therein, means of connection between the shaft and said wheel effecting rotative engagement for one direction of rotation only, and suitable detent mechanism.

2. In a cash-register, the combination of a suitable casing having corresponding indicator-dials on the front and back walls thereof, and a sight-opening through the back wall; a shaft journaled in said casing and extending through the front and back walls thereof; indicator-arms fastened to said shaft and extending over the said dials respectively; a registering-wheel loose on the said shaft within the casing and adjacent to the back wall of the same, where its inscriptions may be seen through the said opening therein, means of connection between the shaft and said wheel effecting rotative engagement for one direction of rotation, and suitable detent mechanism.

3. In a cash-register, the combination of a casing having a series of indicator-dials representing different denominations, shafts journaled in the casing and carrying indicator-arms which extend over the said dials, respectively, registering-disks loosely mounted on the shafts, respectively, within the casing, the registering-disk associated with the dial of the lower denomination having one or more transferring projections, a toothed disk in gear with the registering-disk of higher denomination and having its teeth extending in the path of movement of the said projection on the other registering-disk, means connecting the shafts with their respective registering-disks for rotation in one direction only, means for restoring the indicator-arms to their initial position, and means for preventing backward movement of the registering-disks.

4. In a cash-register, the combination of a casing having a series of indicator-dials representing different denominations, shafts journaled in the casing and carrying indicator-arms which extend over the said dials, respectively, registering-disks loosely mounted on the shafts, respectively, within the casing, the registering-disk associated with the dial of the lower denomination having a gravity-pawl, a toothed disk in gear with the registering-disk of higher denomination and having its teeth extending in the path of movement of the said gravity-pawl on the other registering-disk, means connecting the shafts with their respective registering-disks for rotation in one direction only, means for restoring the indicator-arms to their initial position, and means for preventing backward movement of the registering-disks.

5. In a cash-register, the combination of stationary indicator-dials, shafts carrying indicator-arms which extend over said dials, means associated with said shafts for restoring the arms to initial position, ratchet-wheels on the shafts, pawls engaging the said wheels, a laterally-movable rod or bar engaged with said pawls and having a depending arm, a horizontal arm on the drawer having a double wedge-shaped cam obliquely set on its upper side for engagement with said pendent arm to shift said bar; and registering means connected with the shaft for movement in one direction thereby, with provision for preventing backward movement of the said means, substantially as described.

In testimony whereof I affix my signature in presence of two witnesses.

ALFRED S. WELLS.

Witnesses:
CHARLES E. RIORDON,
S. B. ARMAT.